March 27, 1934.   W. H. TRIMBLE ET AL   1,952,150
CRADLE FOR STORAGE BATTERIES
Filed May 2, 1930   2 Sheets-Sheet 2
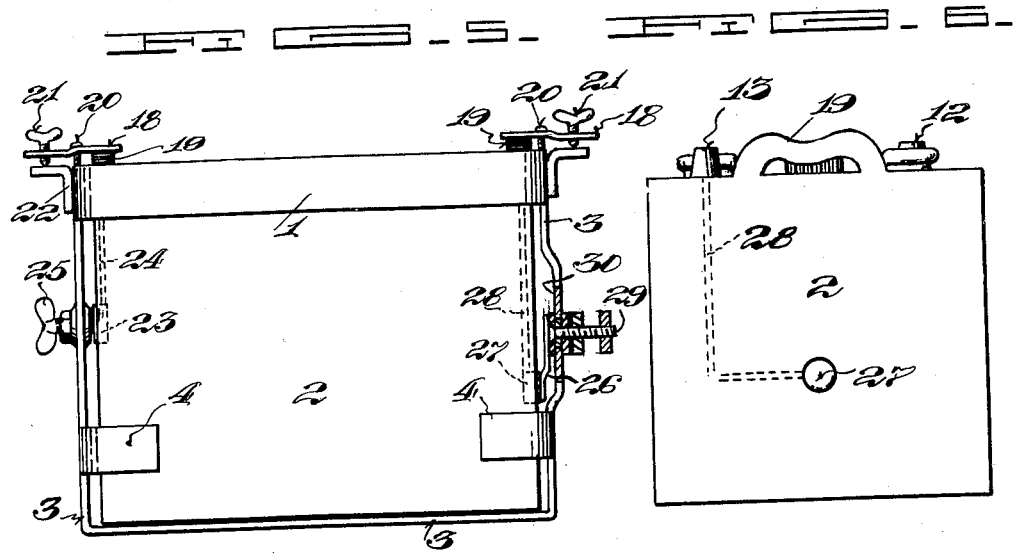
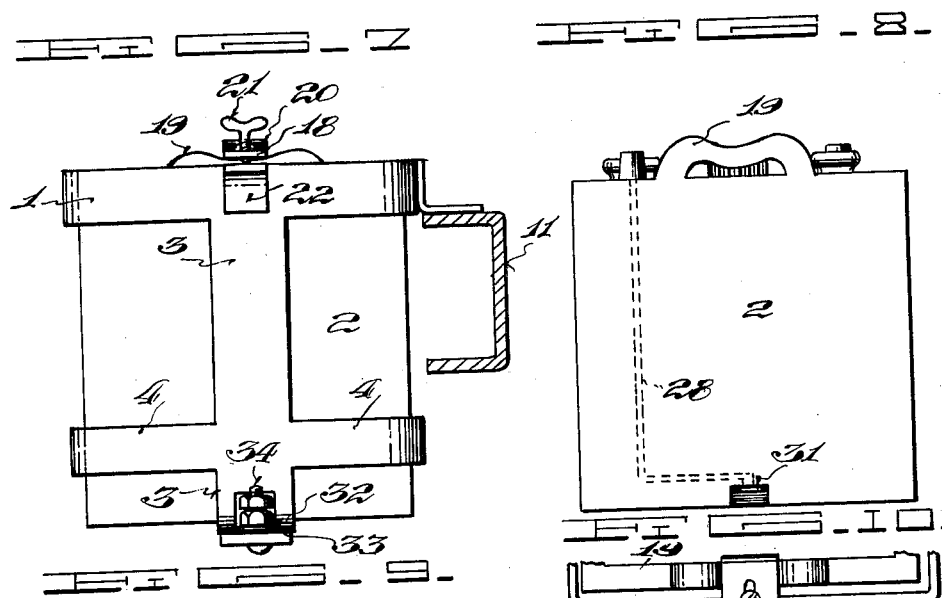
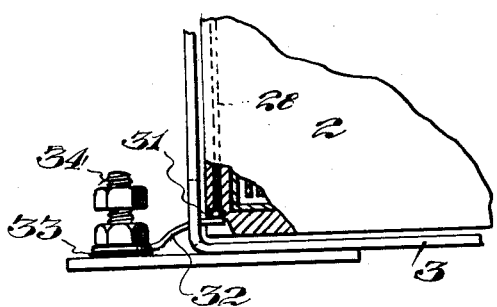
William H. Trimble
John N. Clark
INVENTORS.
BY Ernest G. Wood
ATTORNEY.

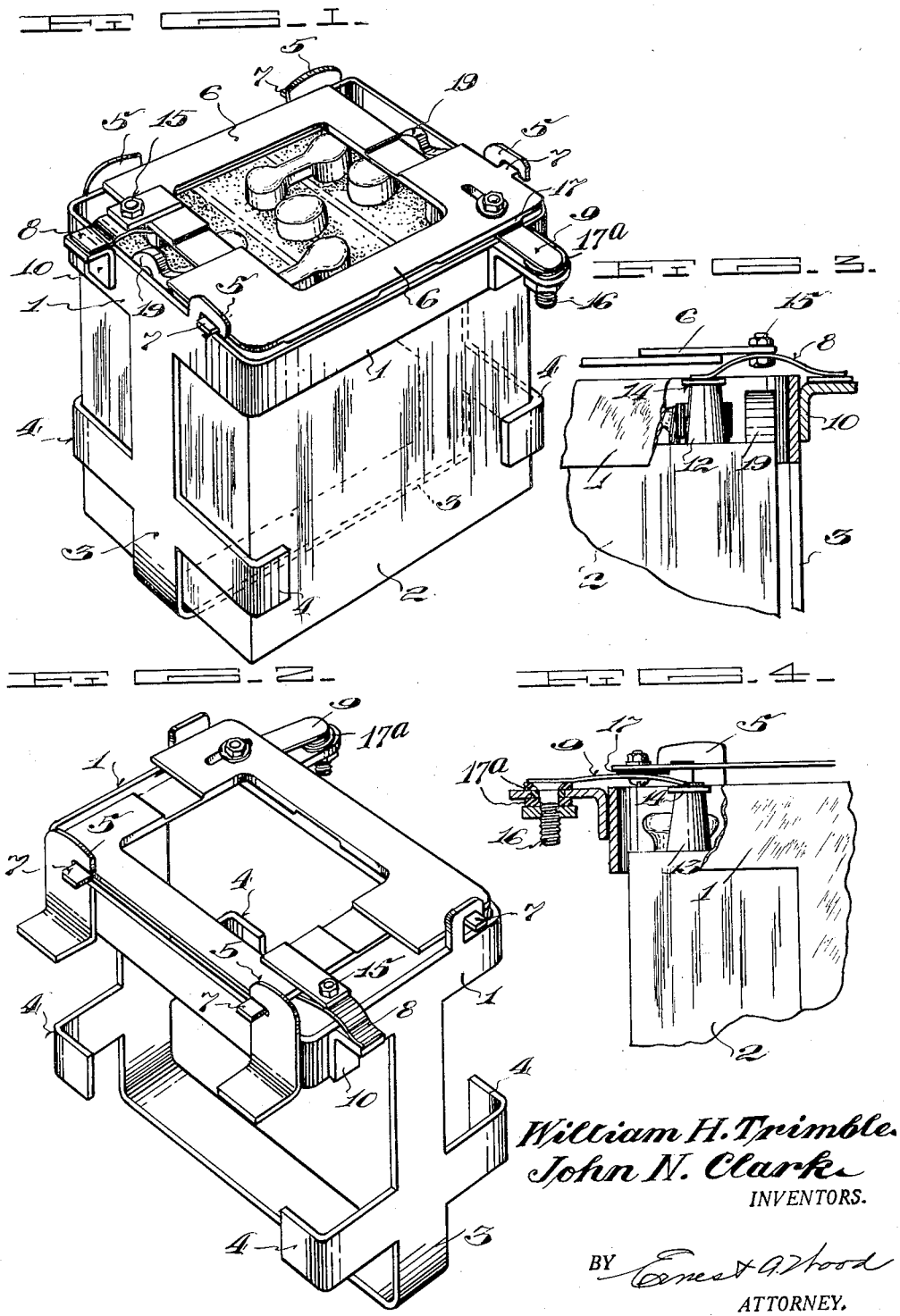

Patented Mar. 27, 1934

1,952,150

UNITED STATES PATENT OFFICE 1,952,150

CRADLE FOR STORAGE BATTERIES

William H. Trimble and John N. Clark, Dallas, Tex.

Application May 2, 1930, Serial No. 449,244

3 Claims. (Cl. 136—171)

This invention relates to storage batteries and it has particular reference to an improved cradle whereby to obtain greater efficiency from the use of the storage battery as applied in the operation of motor vehicles and the principal object of the invention resides in the provision of an improved battery cradle through the use of which cable terminals may be eliminated.

Another object of the invention resides in the provision of an improved contact plate which may be removed with ease and readiness when it is required to replace the battery but so constructed that it will remain in position regardless of severe jolting to which the cradle is subjected, caused by driving vehicles over rough roads, and further the said plate is designed to maintain positive contact with the battery terminal posts at all times thereby insuring against voltage loss which frequently occurs in conventional types of connections due to loose contacts due to corrosion, which objection is removed by the present invention by the provision of brass to brass contacts, frictionally held together under spring tension.

The invention further comprehends, in the provision of an improved battery cradle means by which more convenient and secure contact may be made without requiring the aid of bolts, screws or wedges, which feature is of considerable advantage in converting the battery for radio use, in that leads may be provided to direct battery current to any point on the cradle, to which may be connected wires or cables for any purpose.

With the foregoing objects as paramount, the invention has particular reference to its salient features of construction and arrangement of parts, which will become manifest as the description proceeds, taken in connection with the accompanying drawings, wherein:

Figure 1 is a perspective view of a battery cradle embodying the present invention as it appears with a battery mounted therein.

Figure 2 is a similar view in perspective, showing the opposite side of Figure 1 with the battery removed.

Figure 3 is a fragmentary view of one corner of the invention, showing one of the post contacts.

Figure 4 is a similar view, with portions broken away to show the other of said contacts.

Figure 5 is a side elevational view of the invention with a battery mounted therein, showing the manner in which a cable terminal may be connected at a point remote from the terminal post of the battery and further showing a means by which positive contact is maintained.

Figure 6 is suggestive of the manner in which battery current is transmitted to a remote point on the frame or cradle.

Figure 7 illustrates the manner in which the invention is secured to and grounded upon the frame of a vehicle.

Figure 8 illustrates a battery having a lead terminating at its bottom to enable current to be taken off at the bottom of the cradle when the battery is mounted therein.

Figure 9 is a fragmentary view, showing the contact at the bottom of the cradle by which current may be taken off through the medium of the lead shown in Figure 8, and Figure 10 is a detail view of the means by which the battery is held in the cradle when the improved cover plate is not used.

Accordingly, the invention is comprised of a frame constructed to be in one piece to form a cradle and is comprised of an upper band 1, to surround the top of the battery 2 when the latter is placed within the cradle. A strap 3 passes downward along the sides of the battery and under the same and is provided with lateral projections 4 which extend around the corners of the battery, as shown in Figures 1 and 2. This arrangement securely holds the battery 2 against movement.

Extending upwardly from the upper edge of the band 1 are hooks 5 which, as will be described presently, function to hold the cover 6 securely onto the band 1 and to insure positive contact between the battery connections at all times.

The cover plate 6 is provided with projections 7 which engage under the hooks 5 and is urged upwardly by spring pressure provided by the spring contacts 8 and 9. The spring contact 8 affords a ground connection through the medium of an L-shaped brass member 10, which in the case of its use on an automobile, the battery 2 is grounded to the frame 11 of the vehicle through the medium of this member 10, as shown in Figure 7. It will be noted in Figures 3 and 4 that the battery ground post 12 and positive post 13 have soldered or otherwise affixed thereto a plate 14 of brass or other suitable material, which plate is larger in diameter than the top of the post, as shown. The spring 8, being likewise of brass, engages both the plate 14 and the member 10 and is held secure to the cover plate 6 through the medium of a bolt 15. The particular construction of this spring lends yieldability to the plate 6. This is also true of the spring 9, which forms the electrical connection between contact 16 and the plate 14 on the positive post 13, as shown in Figure 4. These springs 8 and 9, being resilient, normally urge the plate 6 upward to hold the same secure, when the projections 7 thereon are moved under the hooks 5, integral with the band 1 of the frame or cradle.

It is important to note that the positive spring 9 is insulated from the plate 6 by means of an insulating washer 17 shown in Figures 1 and 4, and from the frame 1 by insulating washers 17a; while the negative spring 8 is electrically connected to the plate 6 and frame 1.

In affixing the brass plates 14 to the negative and positive posts respectively designated at 12 and 13, best results are found to be obtainable by first tinning the posts with solder, using beef tallow for flux. The brass plates 14 are then tinned with solder by using flux made of sulphuric acid cut with all of the zinc it will hold in solution. The plates are then applied to the posts as shown and heat applied until the solder melts and runs together, which is done by holding a hot soldering iron on the top of the plate. A secure connection between the plate and the terminal post will form a perfect and solid joint so that corrosion will not accumulate at this point. The foregoing is suggested as a preferred method of application, but it is obvious that other and equally satisfactory methods of applying the contact plates to the posts may be employed.

Figures 5 to 10 inclusive illustrate a modified form of the invention, in that the cover plate 6 is omitted and substituted by securing means in the form of metal clamps 18, the inner ends of which extend over and engage the handles 19 of the battery 2, as shown in Figure 10 especially. These clamps 18 are slidable endwise and are held to the band 1 by means of a set screw 20, however, the clamps 18 are capable of rocking movement in order that the wing nut 21, when turned, will urge the inner ends of the clamps downward against the handles 19, since the end of the wing nut 21 rests upon an inverted L-shaped bracket 22, affixed to the band 1. The structure above described affords a securing means by which the battery 2 is positively held against displacement in the frame or cradle.

The modified structure shown in the figures above mentioned involves a very important feature as embodied in the present invention in that it affords means by which current may be drawn off without requiring that the cable be connected directly to the battery posts 12 and 13. Figure 5 is a side elevational view showing an embedded contact plate 23 having connection through means of an embedded strap 24 to the negative terminal post of the battery 2, which is grounded to the frame 3 through the wing nut 25. The positive connection is established through the medium of a spring contact 26 engaging the embedded contact plate 27, which latter has connection with the positive terminal post 13 of the battery through the strap 28, which is embedded in the wall of the battery. The positive binding post 29, provides a connection at the end of the battery. The insulated washer 30 insulates the spring contact 26 from the frame 3. The only difference between the structure shown in Figures 1 to 4 inclusive and that shown in Figures 5 to 10 inclusive is that connections for cables may be established without the aid of the cover plate 6. The contact plates 23 and 27, and the straps 24 and 28 connected thereto are embedded in the walls of the battery casing, and only the contact points of 23 and 27 are exposed, the contact 23 being the negative or ground connection while the contact point 27 affords positive connection through the binding post 29 rigid with the frame 3. Should it be necessary to remove the battery 2 for repairs, the ends of the straps 24 and 28, affixed to the posts 12 and 13 are heated to such a degree that they may be removed until the battery is replaced, whereupon they may be again heated to effect replacement, which operation need not require that the straps 24 and 28 be detached therefrom.

In Figures 7, 8 and 9 the identical structure as that shown in Figures 5 and 6 is illustrated with the exception that the connections are lowered on the frame to the bottom, the strap 28 being embedded in the wall of the battery casing as before and terminating near its base where a contact plate 31 is provided, against which a spring contact 32 rests and which spring contact is insulated from the frame 3 by means of an insulating washer 33. A binding post 34 is provided to afford connection by which current may be drawn off.

The structure just described is obviously very convenient in that all connections to the battery are automatically made when the battery is set into the cradle or frame. The connections for the positive and negative terminals are frictional and afford a brass to brass contact, thereby preventing corrosion at the points of contact and further eliminating the necessity of treated elements which are difficult and sometimes impossible to remove without serious injury to the battery.

The construction embodying the invention is adaptable for use on a battery whether the latter is employed to supply operating current to the electrical system of a vehicle or for radio and other uses and since the drawings are purely illustrative, certain changes and modifications in the construction and arrangement of parts may be made without departing from the spirit and intent of the invention as set out in the following claims.

What is claimed is:

1. A cradle for storage batteries including a frame, a band integral with the frame and having oppositely disposed hooks integral therewith, an open cover plate having projections corresponding with said hooks, a projecting member carried by said band, a second projecting member carried by said band and having a terminal insulated therefrom, yieldable means carried by said cover plate and frictionally engaging the negative post of a battery and the first of said projecting members to ground said battery and yieldable means carried by said cover plate and insulated therefrom and arranged to frictionally engage the positive post of the battery and said insulated terminal.

2. A cradle for storage batteries including a frame and an integral band surrounding the top thereof and carrying upwardly extending hooks, a cover plate having projections receivable by said hooks, an L-shaped member carried by said frame, means carried by said cover plate and arranged to frictionally engage the negative post of a battery and said L-shaped member, a second L-shaped member carried by said frame and having a terminal insulated therefrom, and means carried by said cover plate and insulated therefrom and arranged to frictionally engage the positive post of the battery and said terminal carried by said L-shaped member.

3. A cradle for a storage battery having positive and negative posts, said cradle including a frame, an integral band at the top of said frame and carrying oppositely disposed hooks, a cover plate having projections corresponding with said hooks, a ground mounting on said band, a flexible connection carried by said cover plate and arranged to frictionally engage the negative post of said battery and said ground mounting, a positive terminal carried by said frame and insulated therefrom, a flexible connection carried by said cover plate and insulated therefrom and arranged to frictionally engage said positive terminal and the positive post of said battery.

WILLIAM H. TRIMBLE.
JOHN N. CLARK.